United States Patent
Cho et al.

(10) Patent No.: US 10,168,584 B2
(45) Date of Patent: Jan. 1, 2019

(54) LIQUID CRYSTAL DISPLAY HAVING IMPROVED TEXTURE RESISTANCE AND SIDE VISIBILITY

(71) Applicant: SAMSUNG DISPLAY CO., LTD., Yongin-si, Gyeonggi-do (KR)

(72) Inventors: Se Hyoung Cho, Hwaseong-si (KR); Sang Hyeon Song, Seoul (KR); Il Gon Kim, Seoul (KR); Mee Hye Jung, Suwon-si (KR)

(73) Assignee: Samsung Display Co., Ltd. (KR)

( * ) Notice: Subject to any disclaimer, the term of this patent is extended or adjusted under 35 U.S.C. 154(b) by 16 days.

(21) Appl. No.: 15/050,944

(22) Filed: Feb. 23, 2016

(65) Prior Publication Data

US 2016/0246132 A1 Aug. 25, 2016

(30) Foreign Application Priority Data

Feb. 25, 2015 (KR) .......... 10-2015-0026649

(51) Int. Cl.
  *G02F 1/1343* (2006.01)
  *G02F 1/1339* (2006.01)
  *G02F 1/1362* (2006.01)

(52) U.S. Cl.
  CPC .... *G02F 1/134309* (2013.01); *G02F 1/13394* (2013.01); *G02F 2001/13398* (2013.01); *G02F 2001/134318* (2013.01); *G02F 2001/134345* (2013.01); *G02F 2001/136218* (2013.01)

(58) Field of Classification Search
  CPC .............. G02F 1/134309; G02F 2001/134318
  See application file for complete search history.

(56) References Cited

U.S. PATENT DOCUMENTS

| | | | | |
|---|---|---|---|---|
| 2006/0158575 | A1* | 7/2006 | Shin ................. | G02F 1/134309 349/38 |
| 2007/0229746 | A1* | 10/2007 | Kim ................. | G02F 1/134309 349/139 |
| 2010/0259712 | A1* | 10/2010 | Jeong ............... | G02F 1/134309 349/128 |
| 2014/0168582 | A1* | 6/2014 | Chang .............. | G02F 1/134309 349/106 |

FOREIGN PATENT DOCUMENTS

| KR | 10-0772478 B1 | 10/2007 |
|---|---|---|
| KR | 10-0851630 B1 | 8/2008 |
| KR | 10-2013-0027370 A | 3/2013 |
| KR | 10-2013-0101329 A | 9/2013 |

* cited by examiner

*Primary Examiner* — Kendrick Hsu
(74) *Attorney, Agent, or Firm* — Innovation Counsel LLP

(57) ABSTRACT

A liquid crystal display (LCD) according to an exemplary embodiment of the present invention includes: a lower panel having a pixel electrode including at least one unit pixel electrode; an upper panel having a common electrode including at least one unit common electrode; and a liquid crystal layer interposed between the lower and upper panels. The unit pixel electrode includes an at least approximately diagonally oriented and parallelogram-shaped center electrode, and further includes a plurality of branches extending from the center electrode, and the common electrode includes an opening extending in a first direction corresponding to a direction of bending of the LCD.

16 Claims, 9 Drawing Sheets

LIQUID CRYSTAL DISPLAY HAVING IMPROVED TEXTURE RESISTANCE AND SIDE VISIBILITY

CROSS-REFERENCE TO RELATED APPLICATION

This application claims priority to, and the benefit of, Korean Patent Application No. 10-2015-0026649 filed in the Korean Intellectual Property Office on Feb. 25, 2015, the entire contents of which are incorporated herein by reference.

BACKGROUND (a) Field of the Invention

Embodiments of the present invention relate generally to flat panel displays. More specifically, embodiments of the present invention relate to liquid crystal displays (LCDs) having improved texture resistance and side visibility.

(b) Description of the Related Art

Presently one of the most widely used flat panel displays, a liquid crystal display (LCD) includes two sheets of display panels containing field generating electrodes such as pixel electrodes, common electrodes, etc., and a liquid crystal layer interposed therebetween. The LCD displays an image by applying a voltage to the field generating electrodes to generate an electric field in a liquid crystal layer, determining directions of liquid crystal molecules through the electric field and thereby controlling polarization of incident light.

Different types of LCDs, including a vertical alignment (VA) mode LCD in which long axes of liquid crystal molecules are arranged to be perpendicular to display panels when no electric field is applied, have been developed. In the VA mode LCD, securing a wide viewing angle has been seen as an important issue, so for this purpose, a method of forming cutouts such as minute slits and the like in the field generating electrode is often used. Since cutouts and protrusions help determine tilt directions of the liquid crystal molecules, they can be appropriately disposed to diversify the tilt directions of the liquid crystal molecules in various directions, thereby realizing a wide viewing angle.

When the pixel electrode is formed with minute slits to have a plurality of branch electrodes, a response speed of the liquid crystal molecules deteriorates due to liquid crystal control that is not associated with the minute slits of the liquid crystal molecules, so undesirable texture is displayed for a predetermined time.

The above information disclosed in this Background section is only for enhancement of understanding the background of the invention and therefore it may contain information that does not form the prior art that is already known in this country to a person of ordinary skill in the art.

SUMMARY

Embodiments of the present invention provide a display device that can provide improved side visibility by generating no texture even when bent.

An exemplary embodiment of the present invention provides a liquid crystal display (LCD) including: a lower panel having a pixel electrode including at least one unit pixel electrode; an upper panel having a common electrode including at least one unit common electrode; and a liquid crystal layer interposed between the lower and upper panels. The unit pixel electrode includes an at least approximately diagonally oriented and parallelogram-shaped center electrode, and a plurality of branches extending from the center electrode, and the common electrode includes an opening extending along a first direction corresponding to a direction of bending of the LCD is bent.

The pixel electrode may include four unit pixel electrodes that are arranged sequentially along the first direction.

Parallelogram shapes of sequentially arranged center electrodes may extend along differing directions.

The four unit pixel electrodes may be arranged so that center electrodes of two adjacent unit pixel electrodes may form an at least approximate V-shape, while center electrodes of the other two unit pixel electrodes may form an at least approximate reverse V-shape.

A vertical groove may be formed between the two adjacent unit pixel electrodes or between the other two unit pixel electrodes.

The opening may be positioned within the collective outer boundary of two adjacent unit pixel electrodes.

The common electrode may have two separate and distinct openings both positioned within the outer boundary of the pixel electrode.

The LCD may have a plurality of the pixel electrodes, and the opening may extend across more than one of the pixel electrodes.

The upper panel may further include color filters.

Ones of the color filters having the same color may be formed in pixels that neighbor each other along the first direction, while ones of the color filters having other colors may be formed in pixels that neighbor each other along a second direction different from the first direction.

The insulation substrate may include a gate line extending along a second direction; a data line extending along the first direction to cross the gate line; and a shielding electrode disposed on the same layer as the pixel electrode and formed above the data line.

The pixel electrode and the shielding electrode may be separated from each other, and the shielding electrode and the common electrode may be arranged to receive the same voltage.

The shielding electrode may include a protruding portion extending over a portion of a thin film transistor region, and a black colored spacer may be formed in the thin film transistor region and spaced apart from the protruding portion is not formed.

The LCD may not have a black matrix; that is, embodiments of the LCD may not have a black matrix therein.

The LCD may be a curved type LCD that is bent along the first direction

The opening may extend along the same direction as the direction along which the LCD is bent.

As described above, in an LCD of the present invention, the center electrode and the branch portions of the pixel electrode are appropriately shaped and a horizontal opening is formed in the common electrode, thereby preventing undesired image texture that can occur when the display device is bent.

In addition, the liquid crystal molecules are arranged in various directions by the shape of the pixel electrode to improve side visibility.

DETAILED DESCRIPTION OF THE EMBODIMENTS

Figure 1:
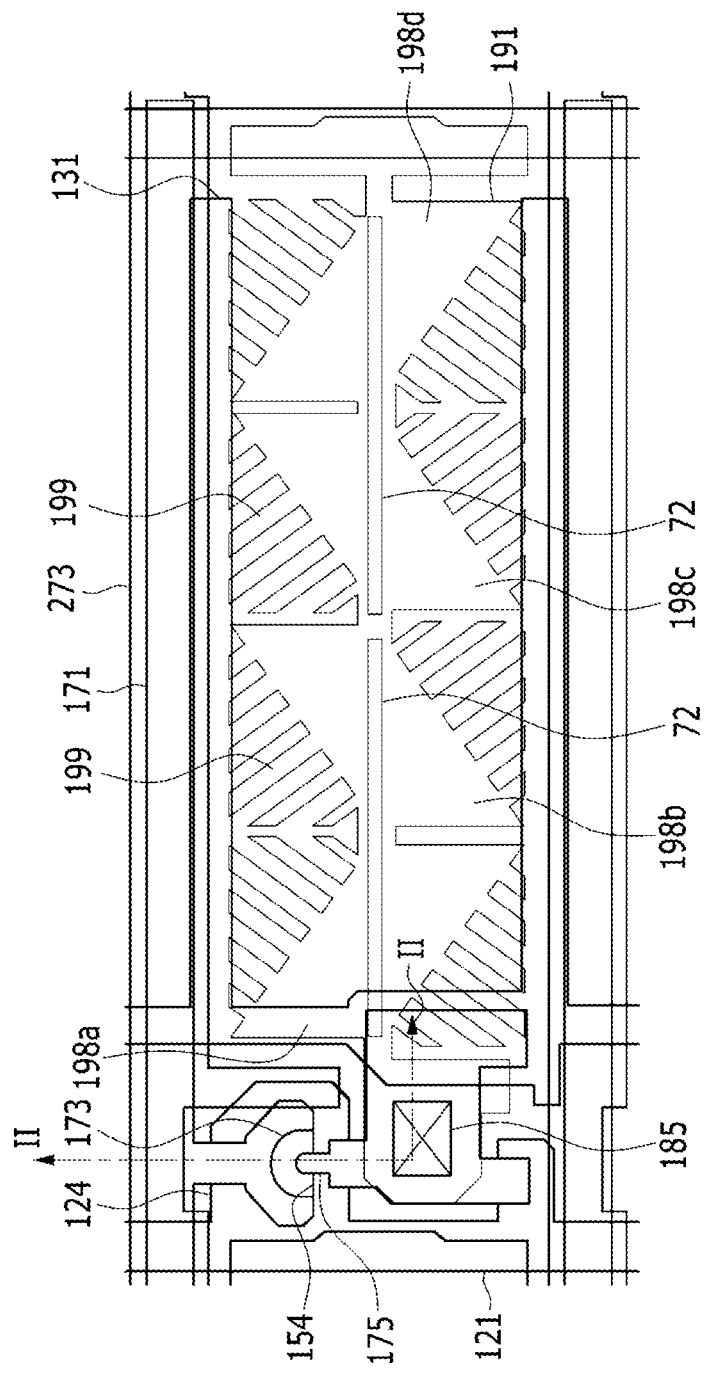
FIG. 1 is a layout view of a liquid crystal display (LCD) according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc. are exaggerated for clarity. The Figures are thus not to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present. All numerical values are approximate, and may vary. All examples of specific materials and compositions are to be taken as nonlimiting and exemplary only. Other suitable materials and compositions may be used instead.

A liquid crystal display (LCD) according to an exemplary embodiment of the present invention will now be described in detail with reference to the drawings.

First, referring to FIGS. 1 and 2, an LCD according to an exemplary embodiment of the present invention will be described. FIG. 1 is a layout view of an LCD according to the exemplary embodiment of the present invention, and FIG. 2 is a cross-sectional view taken along the line II-II of FIG. 1.

Referring to FIG. 1, one pixel according to the exemplary embodiment of the present invention PX is a horizontal-type pixel that is formed to extend in a horizontal direction when viewed in the perspective of FIG. 1.

Figure 2:
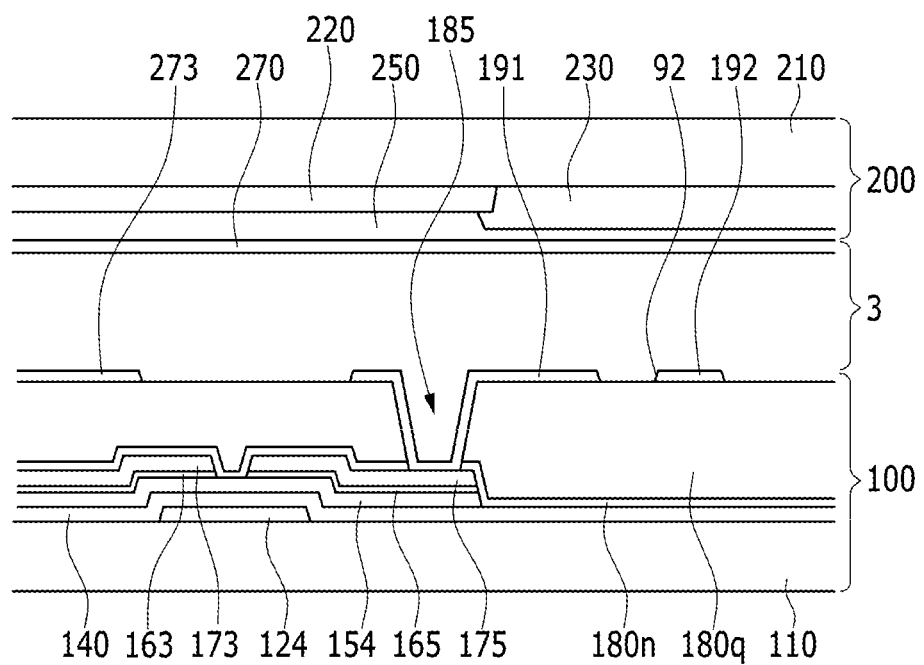
FIG. 2 is a cross-sectional view taken along the line II-II of FIG. 1.

Referring to FIGS. 1 and 2, the LCD according to the exemplary embodiment of the present invention includes a lower panel 100 and an upper panel 200 facing each other, with a liquid crystal layer 3 interposed therebetween.

The lower panel 100 will be described first.

A gate conductor including a gate line 121 and a divided reference voltage line 131 is formed on an insulation substrate 110 that is formed of transparent glass or plastic.

In this case, the gate line 121 is formed generally in a vertical direction. That is, as shown in FIG. 1, a pixel electrode 191 is formed to extend in the horizontal direction, and the gate line 121 is formed to be parallel to a short side of the pixel electrode 191.

The gate line 121 includes a gate electrode 124, and a wide end portion (not shown) for connection with another layer or an external driving circuit. The gate line 121 may be formed of, for example, an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), titanium (Ti), etc. However, the gate line 121 may also have a multilayer structure in which at least two conductive layers having different physical properties are included.

The divided reference voltage line 131 is at least partly formed within a pixel area where the pixel electrode 191 is formed, and may be formed to have a quadrangular shape with one side open. In this case, the side where the divided reference voltage line 131 is not formed may be one edge of the horizontal type pixel. The divided reference voltage line 131 is connected to pixels that neighbor each other in the vertical direction.

A gate insulating layer 140 is formed on the gate conductor 121, and may be formed of a silicon nitride ($SiN_x$) or a silicon oxide ($SiO_x$). The gate insulating layer 140 may also have a multilayer structure in which at least two insulating layers having different physical properties are included.

A semiconductor 154 formed of amorphous silicon or polysilicon is formed on the gate insulating layer 140. The semiconductor 154 may include an oxide semiconductor.

Ohmic contacts 163 and 165 are formed on the semiconductor 154.

The ohmic contacts 163 and 165 may be formed of, for example, a material such as n+ hydrogenated amorphous silicon, in which an n-type impurity such as phosphorus is doped at a high concentration, or silicide. The ohmic contacts 163 and 165 are paired to be disposed on the semiconductor 154. When the semiconductor 154 is an oxide semiconductor, the ohmic contacts 163 and 165 may be omitted.

Data conductors, including the data line 171 which includes a source electrode 173 and a drain electrode 175, are formed on the ohmic contacts 163 and 165 and the gate insulating layer 140.

The data line 171 includes a wide end portion (not shown) for connection with another layer or an external driving circuit. The data line 171 transmits a data signal, and extends in the horizontal direction to cross the gate line 121.

The source electrode 173 is a part of the data line 171, and extends vertically from the data line 171. The source electrode 173 may have a general U shape.

The drain electrode 175 may be formed to be straight, and the drain electrode 175 may be perpendicular to a direction in which the data line 171 extends.

The gate electrode 124, the source electrode 173, and the drain electrode 175 collectively form one thin film transistor (TFT) along with the semiconductor 154, and a channel of the TFT is formed in the semiconductor 154 between the source electrode 173 and the drain electrode 175. The data line 171 and the drain electrode 175 may be formed of, for example, a refractory metal such as molybdenum, chromium, tantalum, titanium, etc. or an alloy thereof, and may have a multilayer structure including a refractory metal layer (not shown) and a low resistance conductive layer (not shown). Examples of this multilayer structure may include a double layer of a chromium or molybdenum (alloy) lower layer and an aluminum (alloy) upper layer, and a triple layer of a molybdenum (alloy) lower layer, an aluminum (alloy)

middle layer, and a molybdenum (alloy) upper layer. However, the data line 171 and the drain electrode 175 may be formed of various metals or conductors in addition to the aforementioned metals. A width of the data line 171 may be about 3.5±0.75 μm.

A first passivation layer 180*n* is disposed on the data conductors 171, 173, and 175, the gate insulating layer 140, and the exposed semiconductor 154. The first passivation layer 180*n* may be formed of an organic insulating material or an inorganic insulating material.

A second passivation layer 180*q* is disposed on the first passivation layer 180*n*. The second passivation layer 180*q* may be omitted. The second passivation layer 180*q* may be a color filter. The second passivation layer 180*q* may uniquely display one of the primary colors if it is the color filter, and the primary colors may be, for example, three primary colors, such as red, green, and blue, or yellow, cyan, magenta, and the like. Though not illustrated, the color filter 230 may also display mixed colors or a white color, in addition to the primary colors listed above.

A pixel electrode 191 is formed on the second passivation layer 180*q*. The pixel electrode 191 includes a center electrode 198, and minute branch portions 199 extending from the center electrode 198. A specific shape of the pixel electrode will be described later.

A first contact hole 185 is formed in the first and second passivation layers 180*n* and 180*q* to expose the drain electrode 175. The pixel electrode 191 is physically and electrically connected to the drain electrode 175 through the first contact hole 185 to receive a voltage from the drain electrode 175.

A shielding electrode 273 is formed on the same layer as the pixel electrode 191 above and along the data line 171. The shielding electrode 273 is positioned at opposite sides of one pixel area along edges thereof, and above the data line 171. The shielding electrode may not be separately disposed in each pixel area but may be formed as a continuum along all its adjacent pixels.

The shielding electrode 273 may be formed of, for example, a transparent conductive material such as indium tin oxide (ITO) or indium zinc oxide (IZO), or a reflective metal such as aluminum, silver, chromium, or an alloy thereof.

The same voltage may be applied to the shielding electrode 273 as the common electrode 270. Since the same voltage is applied to the shielding electrode 273 and the common electrode 270, an electric field is not generated between the shielding electrode 273 and the common electrode 270, and thus the liquid crystal layer 3 interposed therebetween is not aligned. Accordingly, the liquid crystals between the shielding electrode 273 and the common electrode 270 are in a black state. When the liquid crystals exhibit black as described above, the liquid crystals themselves may perform a function of a black matrix. Accordingly, when the shielding electrode 273 is formed along the data line 171, as illustrated in FIG. 1, the black matrix does not need to be formed above the data line 171.

Though not illustrated, an alignment layer is coated on the pixel electrode 191, and this alignment layer may be a horizontal alignment layer that is rubbed in a predetermined direction. However, in an LCD according to another exemplary embodiment of the present invention, an alignment layer includes a photoreactive material to be photo-aligned.

The upper panel 200 will now be described.

A black matrix 220 is formed on an insulation substrate 210 that is formed of a transparent material such as a transparent glass or plastic. The black matrix 220 prevents leakage of light. The black matrix 220 may be formed to correspond to a transistor region where a transistor TFT and the like are formed. In addition, the black matrix 220 may alternatively be formed in the lower substrate.

However, as shown in FIG. 1, since the shielding electrode 273 formed above the data line 171 serves as the black matrix, there is no need to form the black matrix 220 in a region corresponding to the data line.

A plurality of color filters 230 are also formed on the substrate 210. The color filters 230 may alternatively be disposed on the lower panel 110, and in this case, the light blocking member 220 may also be disposed on the lower panel 110.

Like color filters 230 may be arranged along the horizontal direction. That is, in the LCD where the plurality of pixels is formed, color filters of the same color may be formed in a line along the horizontal direction. Specifically, for instance, when red color filters are formed on a plurality of pixels arranged in a row direction, green color filters are formed on a plurality of pixels arranged in one row therebelow and in the row direction, and blue color filters are formed on a plurality of pixels arranged in one row therebelow and in the row direction.

However, the color filters 230 may also be formed in the lower panel 110. Even if the color filters 230 are formed in the lower panel 110, the color filters 230 may be arranged along the horizontal direction.

An overcoat 250 is formed on the color filter 230 and the light blocking member 220. The overcoat 250 may serve to planarize the upper substrate on which the color filter 230 and the light blocking member 220 are formed. The overcoat 250 may be omitted if desired.

A common electrode 270 is formed on the overcoat 250. The common electrode 270 has an opening 72 to correspond to the pixel electrode 191. A specific shape of the common electrode 270 will be described later. An upper alignment layer (not shown) is formed on the common electrode 270. The upper alignment layer may be a vertical alignment layer.

Figure 3:
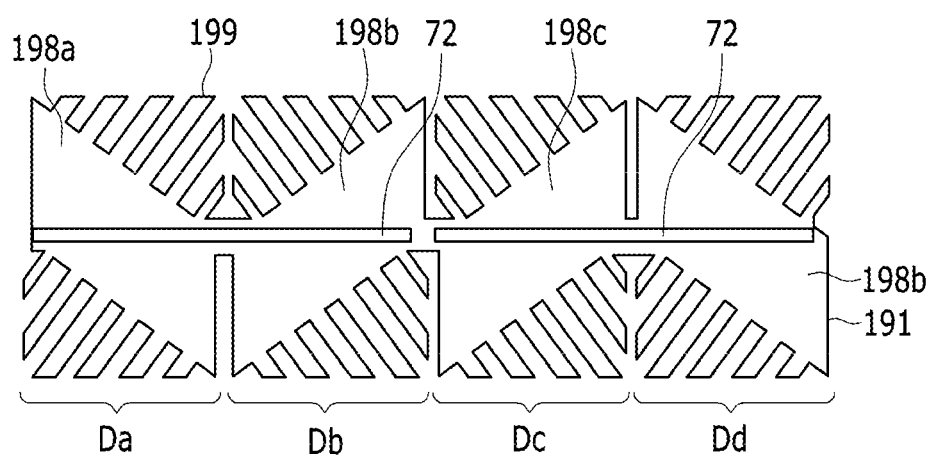
FIG. 3 illustrates a pixel electrode of an LCD of an embodiment of the present invention.
Figure 4:
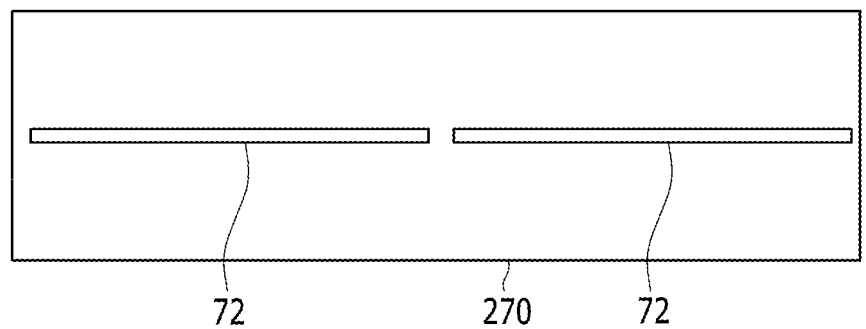
FIG. 4 illustrates a common electrode of an LCD of an embodiment of the present invention.
Figure 5:
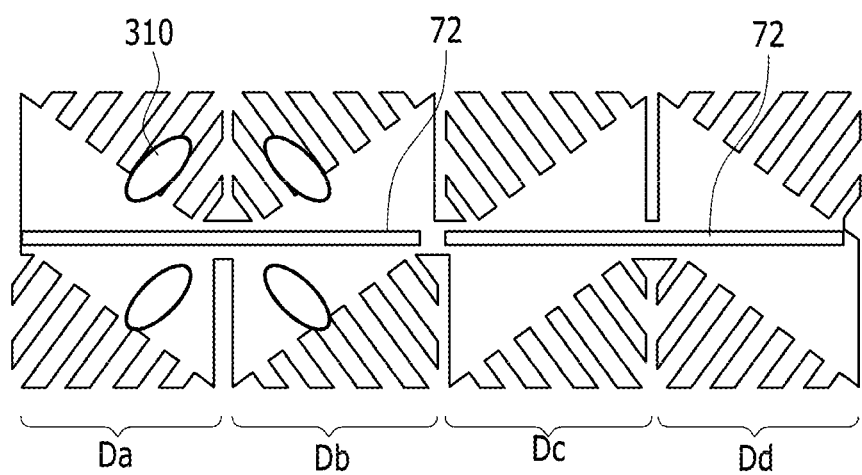
FIG. 5 illustrates an arrangement of liquid crystal molecules and domains in an LCD of an embodiment of the present invention.

Shapes of the pixel electrode and the common electrode of an LCD of the present invention will now be described with reference to FIGS. 1 to 5. FIG. 3 illustrates the pixel electrode of an LCD of the present invention, and FIG. 4 illustrates the common electrode of an LCD of the present invention. FIG. 5 illustrates an arrangement of the liquid crystals and domains in an LCD of the present invention.

First, referring to FIG. 3, a shape of the pixel electrode of an LCD of the present invention will be described. Referring to FIG. 3, the pixel electrode 191 of the present invention includes a plate-shaped center electrode 198, and minute branch portions 199.

In this case, the center electrode 198 has a number of parallelogram shapes. In addition, each parallelogram-shaped center electrode 198 is diagonally disposed.

Referring to FIG. 5, the pixel electrode is divided into a total of four regions. That is, the pixel electrode is divided into a first subregion Da, a second subregion Db, a third subregion Dc, and a fourth subregion Dd. In each subregion, the center electrode 198 is differently arranged.

Referring to FIG. 3, in the first subregion Da, the center electrode 198*a* of the pixel electrode has a parallelogram shape that extends from an upper left corner to a lower right corner.

In the second subregion Db, the center electrode 198*b* of the pixel electrode has a parallelogram shape that extends from a lower left corner to an upper right corner.

The center electrodes 198*a* and 198*b* of the first and second subregions Da and Db may be symmetric with respect to a center of the first and second subregions. In addition, as shown in FIG. 3, the center electrode 198*a* of the first subregion Da and the center electrode 198*b* of the second subregion Db may form an overall and general V-shape.

The minute branch portions 199 diagonally extend from each of the center electrodes 198*a* and 198*b*. In this case, a direction in which the minute branch portions 199 extend is opposite to a direction in which each of the center electrodes 198*a* and 198*b* is arranged. That is, referring to the first subregion Da, since the center electrode 198*a* is diagonally formed from the upper left corner to the lower right corner, the minute branch portions 199 extending from the center electrode 198*a* are formed in a direction from a lower left corner to an upper right corner. This also applies to the other subregions.

In addition, in the third subregion Dc, the center electrode 198*c* of the pixel electrode 191 is arranged in a direction from a lower left corner to an upper right corner. In addition, in the fourth subregion Dd, the center electrode 198*d* of the pixel electrode 191 is arranged in a direction from an upper left corner to a lower right corner.

The center electrodes 198*c* and 198*d* may be symmetric with respect to a center of the third and fourth subregions Dc and Dd. In addition, as shown in FIG. 3, the center electrode 198*c* and the center electrode 198*d* may form an overall and general upside down V-shape.

Minute branch portions 199 diagonally extend from each of the center electrodes 198*c* and 198*d*. In this case, a direction in which the minute branch portions 199 are formed is opposite to a direction in which each of the center electrodes 198*c*, 198*d* is arranged. This is similar to the first and second subregions.

Now, the common electrode 270 of an LCD of the present invention will be described with reference to FIG. 4. Referring to FIG. 4, the common electrode 270 is formed as a generally planar structure, a center of which is formed with the opening 72. In this case, the common electrode 270 is formed as a rectangular structure with openings 72 cut out therefrom.

Each opening 72 determines an alignment direction of the liquid crystals. In this case, because the openings 72 are formed horizontally as shown in the view of FIG. 4, they orient corresponding liquid crystal molecules horizontally as well. In this case, effects of the minute branch portions 199 of the pixel electrode 191 are further added as illustrated in FIG. 3, so the liquid crystals may be finally arranged as shown in FIG. 5 when the electric field is applied to the pixel electrode 191 and the common electrode 270.

FIG. 5 illustrates the arrangement of liquid crystals in an LCD of the present invention. Referring to FIG. 5, the display area of an LCD is divided into the first subregion Da, the second subregion Db, the third subregion Dc, and the fourth subregion Dd.

Referring to FIG. 5, in an LCD of the present invention, the liquid crystal molecules 310 are aligned in predetermined directions by the center electrode 198 and the minute stem portions 199 of the pixel electrode, as well as the openings 72 of the common electrode 270.

According to such alignment, the liquid crystal molecules are aligned in different directions, and as a result, when viewed from sides of the LCD, side visibility can be improved since heads, bodies, and sides of the liquid crystal molecules are equally observed.

Figure 6:
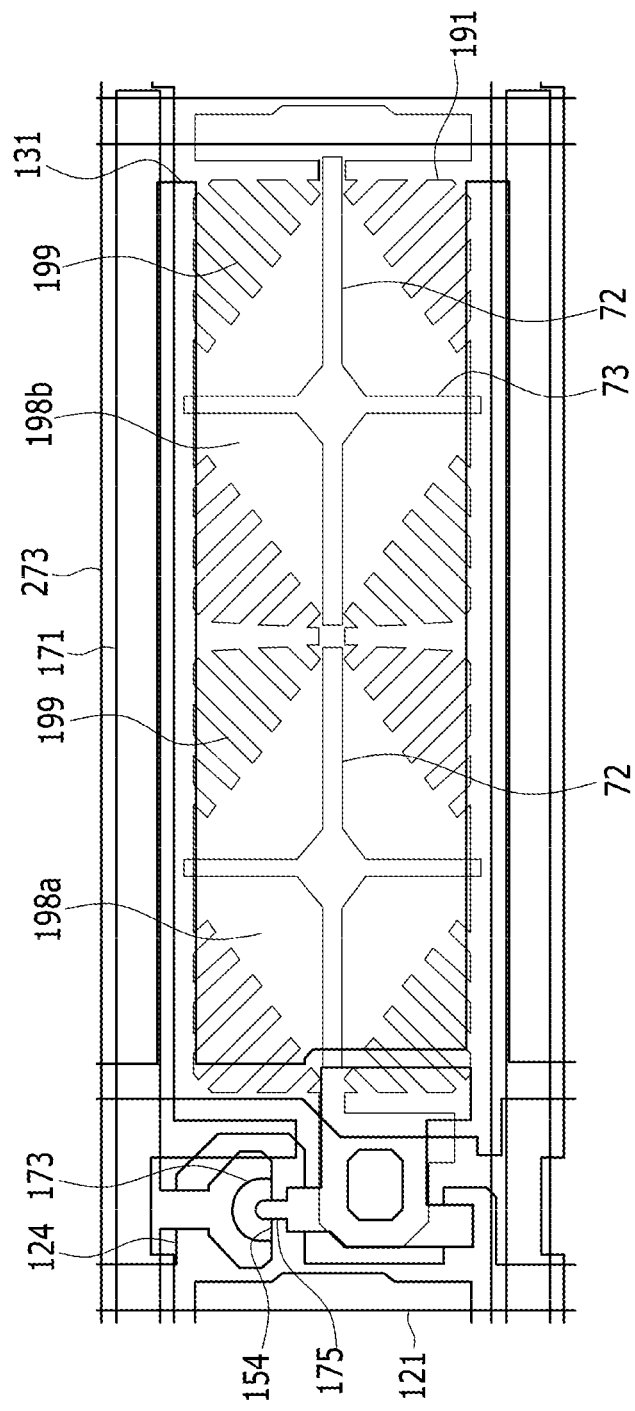
FIG. 6 is a layout view of an LCD according to a comparative example of the present invention.
Figure 7:
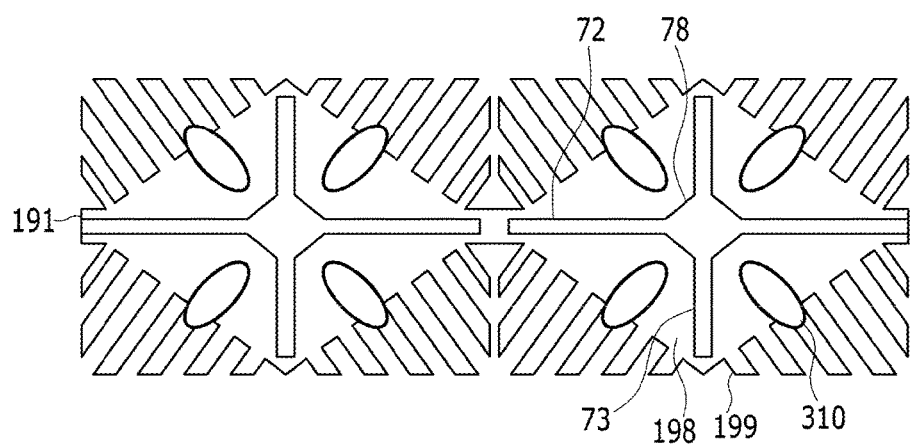
FIG. 7 illustrates an arrangement of liquid crystal molecules in the LCD according to the comparative example of FIG. 6.

In addition, in an LCD of the present invention, only the horizontal opening 72 is formed in the common electrode 270. Accordingly, even if the LCD is bent to the left or right, texture due to misalignment does not occur. Such an effect of the present invention will be described in comparison to a comparative example. FIG. 6 is a layout view of an LCD according to a comparative example. FIG. 7 illustrates an arrangement of liquid crystal molecules in an LCD according to the comparative example of FIG. 6.

Referring to FIG. 6, in an LCD according to the comparative example, shapes of a pixel electrode and a common electrode are different from those of embodiments of the present invention. That is, referring to FIG. 7, the pixel electrode of the LCD according to the comparative example includes a rhombus-shaped center electrode 198, and minute branch portions 199 extending from the center electrode 198.

In addition, in the LCD according to the comparative example, a cross-shaped opening is formed in the common electrode.

Referring to FIG. 7, the common electrode is formed with the cross-shaped opening including a horizontal opening 72 and a vertical opening 73 perpendicular thereto, and may further include a center opening 78 that is positioned at a center of the cross-shaped opening.

The cross-shaped opening of the common electrode is positioned to correspond to the center electrode of the pixel electrode.

Accordingly, the liquid crystal molecules are arranged in four directions, as shown in FIG. 7, by an electric field generated between the center electrode 198 of the pixel electrode, the minute branch portions 199, and the openings 72, 73, and 78 of the common electrode.

Similarly, side visibility can be improved because bodies and heads of the liquid crystal molecules are evenly viewed. However, in the LCD according to the comparative example, it is important that the center electrode 198 of the pixel electrode is disposed to correspond to the openings 72 and 73 of the common electrode. That is, since the alignment directions of the liquid crystal molecules are determined by alignment between the center electrode 198 of the pixel electrode and the openings 72 and 73 of the common electrode, the alignment directions of the liquid crystal molecules are changed from those illustrated in FIG. 7 if the center electrode 198 of the pixel electrode and the openings 72 and 73 of the common electrode are not disposed to correspond to each other.

However, when the LCD is bent to the left and right to realize a curved LCD, misalignment of the upper and lower panels occurs, and the center electrode 198 of the pixel electrode no longer aligns with the openings 72 and 73 of the common electrode. This is because the pixel electrode and the common electrode are respectively provided in the lower and upper panels, and misalignment of the lower and upper panels occurs due to a difference in curvature therebetween when an assembly of the upper and lower panel is bent. Therefore, the cross-shaped opening of the common electrode, and the center electrode 198 of the pixel electrode, are no longer located directly one above the other. As such, when misalignment occurs between the opening of the common electrode and the center electrode of the pixel electrode, the alignment directions of the prearranged liquid crystal molecules are disturbed. That is, since forces are applied to the liquid crystal molecules in different directions, the liquid crystal molecules are no longer arranged as shown in FIG. 7. As described above, such a change in the alignment directions of the liquid crystal molecules is recognized as texture.

However, in an LCD according to the exemplary embodiment of the present invention, such as that of FIG. 3, the opening of the common electrode 270 is formed only in the horizontal direction. Accordingly, even if the LCD is bent in the horizontal direction, the electric field associated with the opening of the common electrode is not affected. That is, since the correspondence between the opening of the common electrode and the center electrode of the pixel electrode does not have a significant effect on the arrangement of the liquid crystal molecules, the liquid crystal molecules may be maintained in the same arrangement even if the common electrode is bent in the horizontal direction to cause horizontal misalignment.

Since the opening of the common electrode is formed only in the horizontal direction, the horizontal opening still exists in the pixel area, and is of the same horizontal size and location, even after misalignment. Accordingly, the liquid crystal molecules are not affected even if misalignment occurs.

In FIGS. 2 and 4, the horizontal opening 72 of the common electrode is illustrated to have a partially broken part. That is, there are two horizontal openings 72 spaced apart from each other and separated by a part of the common electrode 270. However, in another exemplary embodiment of the present invention, there may instead be a single continuous horizontal opening 72 instead. For example, in FIG. 4, the small portion of common electrode 270 separating the two horizontal openings 72 may be removed to form a single, larger and continuous opening 72 rather than two separate, smaller openings 72.

In addition, the horizontal opening 72 of the common electrode may be formed such that it is not broken across a plurality of horizontally adjacent pixel areas. That is, the horizontal opening 72 may be extended to span, or extend across, more than one pixel area.

Figure 8:
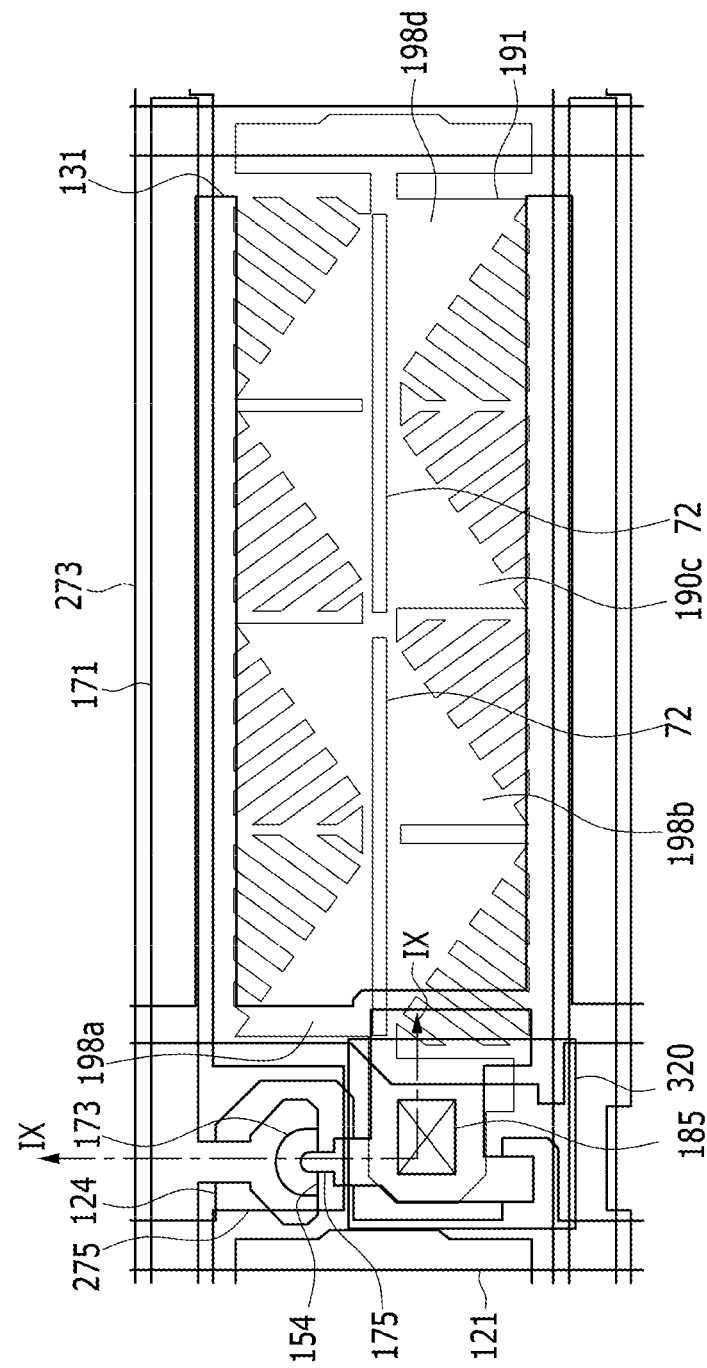
FIG. 8 is layout view of a display device according to another exemplary embodiment of the present invention.
Figure 9:
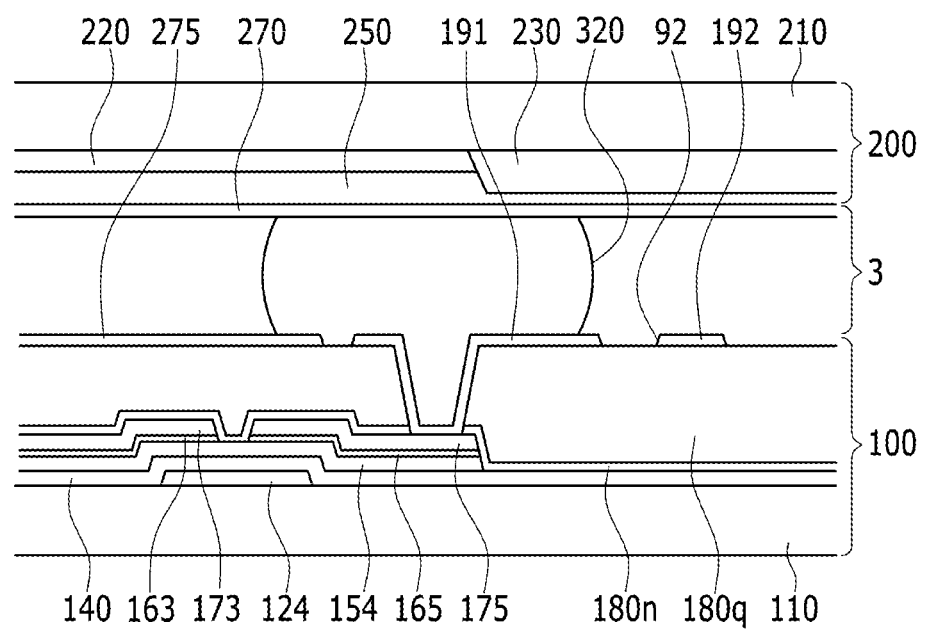
FIG. 9 is a cross-sectional view of the display device of FIG. 8 taken along the line IX-IX.

FIG. 8 is a layout view of a display device according to another exemplary embodiment of the present invention. FIG. 9 is a cross-sectional view taken along the line IX-IX of FIG. 8. Referring to FIG. 8, the display device according to the exemplary embodiment of FIG. 8 has mostly the same components as the display device according to the exemplary embodiment of FIG. 1. For brevity, a detailed description of like components will thus be omitted.

A display device according to the exemplary embodiment of FIG. 8 has a protruding portion 275 that is a part of the shielding electrode 273 and protrudes therefrom, toward the transistor region. The protruding portion 275 of the shielding electrode 273 thus also receives the same voltage as the shielding electrode 273.

Accordingly, the protruding portion 275 of the shielding electrode also performs the function of the black matrix as described above.

Referring to FIG. 8, the display device according to the exemplary embodiment of the present invention includes a spacer 320 that is formed in the transistor region where no shielding electrode is present.

The spacer 320 not only serves to maintain an interval or gap between the upper substrate 200 and the lower substrate 100, but also acts as a light blocking member because it is formed of a black colored material.

That is, in the display device according to the exemplary embodiment of FIG. 8, light is blocked partially by the protruding portion 275 of the shielding electrode 273 in the transistor region, and also by the black colored spacer 320 in a region where the shielding electrode is not formed.

Accordingly, the black matrix can be removed from the thin film transistor region as well as from the region where the data line is formed.

Referring to FIG. 9, the black matrix is not formed in that portion of the upper substrate corresponding to the thin film transistor region. The protruding portion 275 is formed instead in the lower substrate to extend from the shielding electrode toward the transistor region. Furthermore, the black colored spacer 320 is formed in the transistor region where the protruding portion 275 of the shielding electrode is not present, so as to replace the black matrix.

Accordingly, the process can be simplified and an aperture ratio can be increased since an additional margin is not required.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Furthermore, different features of the various embodiments, disclosed or otherwise understood, can be mixed and matched in any manner to produce further embodiments within the scope of the invention.

<Description of Symbols>

| | |
|---|---|
| 110, 210: insulation substrate | 3: liquid crystal layer |
| 121: gate line | 124: gate electrode |
| 131: divided reference voltage line | 140: gate insulating layer |
| 154: semiconductor | 163, 165: ohmic contact |
| 171: data line | 173: source electrode |
| 175: drain electrode | 180, 180n, 180q: passivation layer |
| 191: pixel electrode | 198: center electrode |
| 199: minute branch portions | 270: common electrode |
| 72: opening | 273: shielding electrode |
| 273: protruding portion of shielding electrode | 310: liquid crystal molecule |
| | 220: black matrix |
| 320: spacer | 250: overcoat |
| 230: color filter | |

What is claimed is:

1. A liquid crystal display (LCD) comprising:
    a lower panel having a pixel electrode including at least one unit pixel electrode;
    an upper panel having a common electrode including at least one unit common electrode; and
    a liquid crystal layer interposed between the lower and upper panels,
    wherein the unit pixel electrode includes an at least approximately diagonally oriented and parallelogram-shaped center electrode, and further includes a plurality of branches extending from the center electrode, and the common electrode includes an opening extending along a first direction which extends substantially parallel to a data line and does not include an opening extending along a second direction substantially perpendicular to the first direction, and
    wherein the pixel electrode includes an opening that is disposed along the second direction.

2. The LCD of claim 1, wherein the pixel electrode includes four unit pixel electrodes that are arranged sequentially along the first direction.

3. The LCD of claim 2, wherein, the four unit pixel electrodes are connected to one another and arranged so that center electrodes of two adjacent unit pixel electrodes form an at least approximate V-shape, while center electrodes of the other two unit pixel electrodes form an at least approximate reverse V-shape.

4. The LCD of claim 3, wherein a vertical groove is formed between the two adjacent unit pixel electrodes or between the other two unit pixel electrodes.

5. The LCD of claim 2, wherein the opening is positioned within the collective outer boundary of two adjacent unit pixel electrodes.

6. The LCD of claim 1, wherein parallelogram shapes of sequentially arranged center electrodes extend along differing directions.

7. The LCD of claim 1, wherein the common electrode has two separate and distinct openings both positioned within the outer boundary of the pixel electrode.

8. The LCD of claim 1, wherein the upper panel further includes color filters.

9. The LCD of claim 8, wherein ones of the color filters having the same color are formed in pixels that neighbor each other along the first direction, while ones of the color filters having other colors are formed in pixels that neighbor each other along the second direction different from the first direction.

10. The LCD of claim 1, wherein the lower panel includes a gate line extending along the second direction; a data line extending along the first direction to cross the gate line; and a shielding electrode disposed on the same layer as the pixel electrode and formed above the data line.

11. The LCD of claim 10, wherein the pixel electrode and the shielding electrode are separated from each other, and the shielding electrode and the common electrode are arranged to receive the same voltage.

12. The LCD of claim 10, wherein the shielding electrode includes a protruding portion extending over a portion of a thin film transistor region, and wherein a black colored spacer is formed in the thin film transistor region and spaced apart from the protruding portion.

13. The LCD of claim 12, wherein the LCD does not have a black matrix.

14. The LCD of claim 1, wherein the LCD is a curved LCD that is bent along the first direction.

15. The LCD of claim 14, wherein the opening extends along the same direction as the direction along which the LCD is bent.

16. The LCD of claim 1, wherein the first direction corresponds to a direction of bending of the LCD.

\* \* \* \* \*